United States Patent [19]

Amedei et al.

[11] Patent Number: 4,957,016

[45] Date of Patent: Sep. 18, 1990

[54] VEHICLE TRANSMISSION, PARTICULARLY FOR AN AGRICULTURAL TRACTOR

[75] Inventors: Giuseppe Amedei, Modena; Angelo Rondelli, Cento, both of Italy

[73] Assignee: Fiatgeotech - Technologie Per La Terra S.p.A, Modena, Italy

[21] Appl. No.: 497,832

[22] Filed: Mar. 22, 1990

Related U.S. Application Data

[63] Continuation of Ser. No. 359,211, May 31, 1989, abandoned.

[30] Foreign Application Priority Data

May 31, 1988 [IT] Italy ................. 67501 A/88

[51] Int. Cl.⁵ .................... B60K 20/14; B60K 20/16
[52] U.S. Cl. .................... 74/336 R; 74/335; 74/340
[58] Field of Search ........... 74/333, 335, 336 R, 74/339, 340, 357, 360

[56] References Cited

U.S. PATENT DOCUMENTS

| | | | |
|---|---|---|---|
| 3,667,309 | 6/1972 | Franz et al. ........................ | 74/340 |
| 3,863,518 | 2/1975 | Webber et al. ..................... | 74/340 |
| 4,245,514 | 1/1981 | Miyahara et al. ................. | 74/336 R X |
| 4,513,631 | 4/1985 | Koivunen ......................... | 74/357 X |
| 4,560,045 | 12/1985 | Walsh ............................... | 192/3.58 |
| 4,565,102 | 1/1986 | Miyahara et al. ................ | 74/340 X |
| 4,579,015 | 4/1986 | Fukui ............................... | 74/335 X |
| 4,580,459 | 4/1986 | Zeuker et al. .................... | 74/357 X |
| 4,627,312 | 12/1986 | Fujieda et al. ................... | 74/336 R X |
| 4,637,269 | 1/1987 | Hasegawa et al. ............... | 74/335 |
| 4,726,245 | 2/1988 | Klaue ............................... | 74/336 R |
| 4,777,837 | 10/1988 | Lehle .............................. | 74/333 X |

FOREIGN PATENT DOCUMENTS

| | | |
|---|---|---|
| 3527390 | 2/1987 | Fed. Rep. of Germany . |
| 3618515 | 12/1987 | Fed. Rep. of Germany . |
| 8001502 | 7/1980 | France . |

*Primary Examiner*—Dwight Diehl
*Attorney, Agent, or Firm*—Kane, Dalsimer, Sullivan, Kurucz, Levy, Eisele and Richard

[57] ABSTRACT

A transmission for an agricultural tractor featuring a large number of gears and comprising a first six-gear stage and a second reverse-reduction stage having three forward and one reverse speed ranges. The first stage comprises a pair of drive shafts selectively connectable to an input shaft via respective hydraulic clutches and to an output shaft via constant mesh gears respectively defining the odd and even number gears and engaging the output shaft via sliding couplings controlled by three-position hydraulic actuators. The actuators are operated by respective pairs of on-off solenoid valves supplied via a proportional-response solenoid valve, further proportional-response solenoid valves controlling engagement and release of the aforementioned clutches. All the aforementioned solenoid valves are controlled by an electronic control unit for appropriately controlling engagement of the clutches and actuators as a function of the actual service conditions of the tractor.

11 Claims, 2 Drawing Sheets

VEHICLE TRANSMISSION, PARTICULARLY FOR AN AGRICULTURAL TRACTOR

This is a continuation of copending application Ser. No. 359,211 filed on May 31, 1989, abandoned.

BACKGROUND OF THE INVENTION

The present invention relates to a vehicle transmission featuring a large number of gears, particularly for an agricultural tractor or similar. Known vehicle transmissions of the aforementioned type are usually characterised by enabling gear shifting under load, with no interruption in the torque transmitted between the engine and wheels. This is usually achieved by employing selectively engageable clutch means for each gear, or a pair of clutches for two drive shafts connected to respective sets of gears, and further clutch means for connecting said gears to an output shaft.

In both cases, the clutch means are usually operated hydraulically, and controlled via an electronic control system providing for appropriate operating cycles. A major drawback of known transmissions of the aforementioned type is that said operating cycles are determined as a function of average vehicle service conditions, with no regard to other than average load, speed or service conditions. Moreover, the transmission hydraulic circuits and actuators are relatively complex and expensive to produce.

SUMMARY OF THE INVENTION

The aim of the present invention is to provide a vehicle transmission for an agricultural tractor or similar, designed to overcome the drawbacks typically associated with know transmissions of the aforementioned type. With this aim in view, according to the present invention, there is provided a vehicle transmission, particularly for an agricultural tractor, comprising an input shaft; at least a first stage having two drive shafts selectively connectable to said input shaft via respective first hydraulic clutch means, an input shaft angularly connectable to each said input shaft via a number of transmission ratios defined by respective constant mesh gears, and second selective clutch means for each pair of adjacent said gears, operated by respective three-position hydraulic actuators; and control means for controlling said first clutch means and said hydraulic actuators; characterised by the fact that said control means comprise two on-off solenoid valves for each said hydraulic actuator, each designed to control engagement of a respective transmission ratio; two proportional-response solenoid valves for engaging and releasing respective said first clutch means on said drive shafts; at least a third proportional-respose solenoid valve for regulating supply pressure to said on-off solenoid valves; and a control unit designed to control said solenoid valves in such a manner as to engage and release said first and second clutch means according to predetermined laws depending on the service condition of said vehicle.

BRIEF DESCRIPTION OF THE DRAWINGS

A preferred non-limiting embodiment of the invention will be described by way of example with reference to the accompanying drawings, in which.

DETAILED DESCRIPTION OF THE INVENTION

Figure 1:
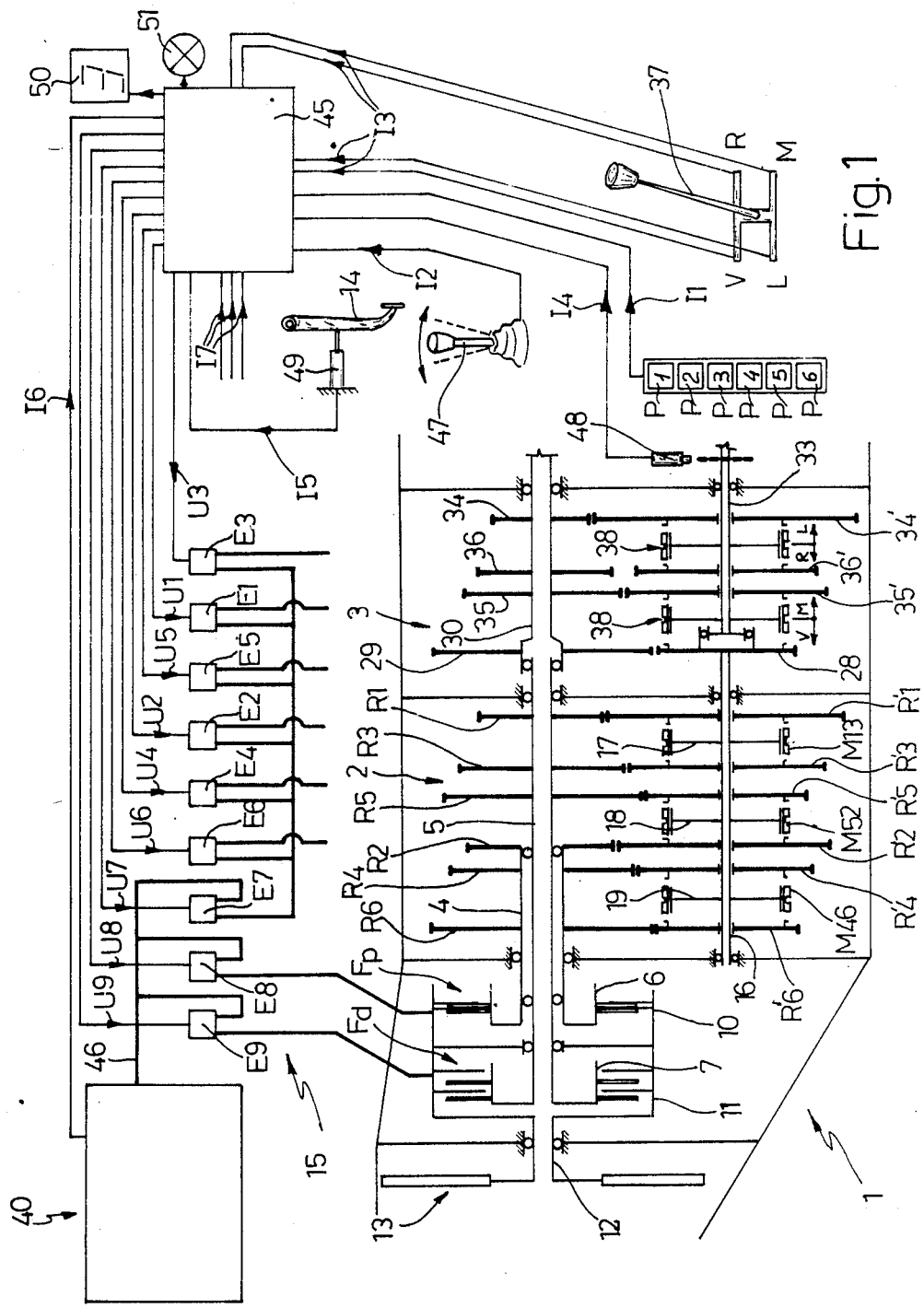
FIG. 1 shows an operating diagram of a transmission in accordance with the teachings of the present invention.

Number 1 in FIG. 1 indicates a transmission for an agricultural tractor.

Transmission 1 is of the type referred to by technicians as a "power shift", i.e. designed to enable up and down shifting under load, without going through neutral. Transmission 1 substantially comprises a first stage 2 defining a number of transmission ratios, e.g. six; and a second stage 3 defining a number of forward ratios, e.g. three, and one reverse ratio. Said first and second stages 2 and 3 are cascade-connected to each other, so as to define a large number of forward and reverse gears (eighteen and six respectively in the example shown).

Said first stage 2 comprises two hollow coaxial input shafts 4, 5 angularly connected at one end to hubs 6, 7 of two hydraulic multiple-disk clutches Fp, Fd. These present respective outer casings 10, 11 integral with each other and connected angularly to an input shaft 12 of transmission 1, said shaft 12 being driven by a central clutch 13 on the vehicle, controlled in the usual way via pedal 14. Clutch Fp is maintained normally engaged by elastic means (not shown), and is releasable via hydraulic control means indicated as a whole by 15 and described in detail later on. Clutch Fd, on the other hand, is normally released, and engageable via said control means 15. An end portion of shaft 5, opposite clutch Fd and projecting axially from shaft 4, is fitted with three gears R1, R3, R5 arranged in that order commencing from the end of shaft 5. Similarly, shaft 4 is fitted with three gears R2, R4, R6.

Said gears R1, . . . , R6 mesh with respective gears R'1,. . . , R'6 mounted in idle manner on an output shaft 16 of stage 2, having its axis parallel to the axes of shafts 4, 5. Shaft 16 is fitted with three toothed hubs 17, 18, 19 respectively inserted axially between gears R'1 nd R'3, R'5 and R'2, R'4 and R'6. Hubs 17, 18, 19 may be connected angularly and selectively, via respective sliding couplings M13, M52, M46 and known synchronizing means (not shown), to either of the two adjacent gears, so as to angularly connect shaft 4 or 5 to output shaft 16. Six transmission ratios or gears are thus obtainable. For example, rightward displacement of coupling M13 engages gear R'1 with shaft 16, to give a transmission ratio determined by gear pair R1, R'1 (first gear); similarly, second gear is obtained by moving coupling M52 leftwards to engage gear R'2 and shaft 16. Couplings M13, M52, M46 are operated by respective actuators A13, A52, A46 shown schematically in FIG. 2 and controlled by control means 15 as described later on. Said actuators are conveniently of the type described in Italian Industrial Patent Application entitled "Fluid-controlled actuator" filed on the same date by the present Applicant and the content of which is included herein by way of reference as required.

Actuators A13, A52, A46 substantially comprise a dual-rod piston 23 sliding in a cylindrical cavity 24. Piston 23 is fitted with two bushes 26 designed to slide in sealed manner between piston 23 and the inner walls of cavity 24, and to cooperate with respective stop rings 27 located on a center portion of cavity 24 and piston 23 for determining a central stop position of said piston 23. Inside cavity 24, piston 23 and bushes 26 form two isolated chambers indicated by the letter C in FIG. 2 followed by the number of the gear engaged when said chamber is pressurized (C1,...,C6) as described in more detail later on. Piston 23 of each actuator is connected to the respective sliding coupling via known retaining means (not shown), e.g. a fork.

One end of output shaft 16 of first stage 2 is fitted with a gear 28 meshing with a respective gear 29 fitted on to input shaft 30 of second stage 3 and coaxial with shafts 4, 5. Said second stage 3 is a known reverse-reduction stage (therefore, not described in detail) substantially comprising an output shaft 33 coaxial with output shaft 16 of first stage 2, and fitted with three idle gears 34', 35', 36', two of which (34', 35') mesh with respective gears 34, 35 on input shaft 30, and the third of which (36') is connected angularly via an intermediate gear (not shown) to a gear 36 integral with shaft 30. Second stage 3 is controlled in known manner by a four-position (L,M,V,R) hand-operated lever 37 controlling known clutch means 38 (not shown) designed to connect output shaft 33 selectively to gear 34' ("slow" speed range position L); to gear 36' (reverse position R); to gear 35' ("medium" range position M); or gear 28 ("fast" range position V) wherein shafts 16 and 33 are connected directly.

Figure 2:
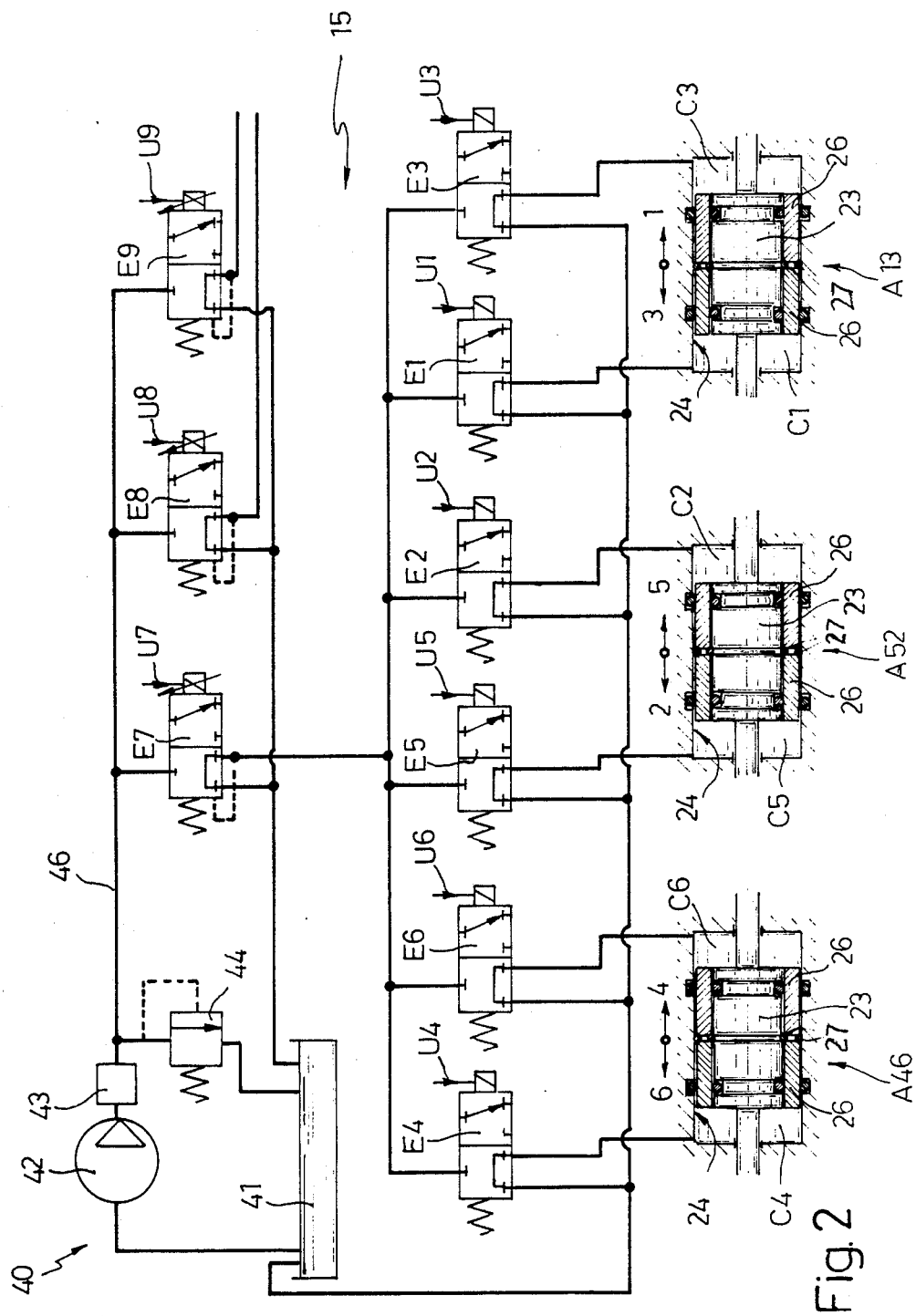
FIG. 2 shows the hydraulic circuit controlling the FIG. 1 transmission.

FIG. 2 shows a detailed diagram of hydraulic means 15 for controlling clutches Fp, Fd and actuators A13, A52, A46. Said means 15 comprise a hydraulic control system 40 and a number of three-way (intake, delivery, drain) solenoid valves E1, ... ,E9. Control system 40 presents a tank 41, a pump 42, a pressure switch 43 and a bypass valve 44 connected in known manner, and, together with solenoid valves E1, ... ,E9, is controlled by a microprocessor-based control unit 45. Solenoid valves E7, E8, E9 are of the proportional-response type, i.e. designed to provide a delivery pressure varying as a function of an analog signal from control unit 45. The inlets of said solenoid valves are connected to a hydraulic feed line 46 from hydraulic system 40 and, in the absence of electric control signals, the delivery outlets of said solenoid valves are connected to a drain outlet.

The delivery outlets of solenoid valves E8 and E9 are respectively connected to clutches Fp and Fd, and, as already stated, activation of solenoid valves E8 and E9 provides for releasing clutch Fp and engaging clutch Fd.

The delivery outlet of solenoid valve E7 is connected to respective inlets of on-off solenoid valves E1, ... , E6, the delivery outlets of which are connected to respective chambers C1, ... , C6 of actuators A13, A52, A46, which are normally connected to the drain outlet. In the presence of a digital control signal from control unit 45, chambers C1,... ,C6 are connected to solenoid valve E7.

Control unit 45 comprises known storage and processing means (therefore, not described in detail) and receives the following input signals:
- six signals I1 from respective push-buttons P for selecting a gear in said second stage 3;
- two signals I2 generated by a hand-operated lever 47, e.g. via rocking contacts, for respectively selecting the next gear up or down;
- four signals I3 generated by respective switches (not shown) operated by lever 37 in positions L,M,V,R;
- a signal 14 from a sensor 48 for determining the speed of output shaft 33;
- a signal 15 from a sensor 49 for determining the position of pedal 14 of central clutch 13;
- a signal 16 from pressure switch 43 of hydraulic control system 40;
- three signals 17 from respective sensors (not shown) for determining the position of actuators A13, A52, A46 as described in said patent application.

As described in more deatail later on, in connection with overall operation of transmission 1, the above input signals are processed by control unit 45 to produce the following output signals:
- six signals U1, ... ,U6 for controlling respective solenoid valves E1, ... , E6;
- three analog signals U7, U8, U9 for controlling solenoid valves E7, E8, R9.

Control unit 45 is also connected to a display 50 showing which gear is engaged, and an indicator light 51 for indicating any faults on hydraulic control system 40. Before going on to describe overall operation of transmission 1, a brief description will first be given of the mechanical operation of first stage 2. Second stage 3 operates in known manner, and therefore needs no explanation.

When engaged, clutches Fd and Fp transmit motion from input shaft 12 to shafts 5 and 4 respectively. Consequently, by virtue of shaft 5 being fitted with gears R1, R3, R5, engagement of clutch Fd enables engagement of the odd number gears. Similarly, by virtue of shaft 4 being fitted with gears R2, R4, R6, engagement of clutch Fp enables engagement of the even number gears. Up or down shifting is thus effected by simultaneously engaging the next and current speed gears on shaft 16, and then shifting both clutches Fp, Fd, which provides for smooth, gradual shift under load. As already stated, engagement and release of clutches Fp, Fd are controlled by proportional-response solenoid valves E8, E9, which provides for appropriately regulating the control pressure of clutches Fp, Fd during engagement or release, as a function of the actual load on the engine i.e. as as a function of service and load conditions of the tractor. Such load conditions, in fact vary substantially should the tractor be connected to a trailer (substantially inertial load) or a plough or similar fixture (low-inertia, high-stress load).

Overall operation of transmission 1, and in particular hydraulic control means 15 and control unit 45, will be described with reference to a number of demonstration examples.

When the tractor is idle, output signals U1, ... ,U9 are all zero; solenoid valves E1,... ,E9 are connected normally to the drain outlet; actuators A13, A52, A46 are set to neutral (stage 2 in neutral); clutch Fp is engaged and clutch Fd released. To pull away, the operator steps on pedal 14 of center clutch 13 so as to mechanically engage the same, shifts lever 37 manually to engage a given speed range (L,M,V,R), and engages a given gear, e.g. the first, by means of respective push-button P. Control unit 45 receives respective signals 15, 13, I1 and accordingly:
- enables signal U1: solenoid valve E1 switches to connect chamber C1 of actuator A13 to the delivery outlet of solenoid valve E7, as of yet connected to the drain outlet;
- enables variable signal U7: proportional-response solenoid valve E7 gradually increases delivery pressure and pressurizes chamber C1 of acutator A13, so as to move piston 23 rightwards, operate coupling M13, engage the first gear (gear R'1 connected to shaft 16), and enable respective signal 17;
- supplies signals U8, U9 to solenoid valves E8, E9; clutch Fp is released and clutch Fd engaged to connect shaft 5 and, consequently, gear R1 to input shaft 12.

The operator may now pull away by releasing pedal 14 of central clutch 13, which is detected by control unit 45 via signal 15. Control unit 45 accordingly de-energizes solenoid valves E1, E7, and the gear remains engaged by virtue of no axial pressure being exerted on coupling M13 and piston 23 of respective acutator A13.

The six gears of first stage 2 are engaged without operating central clutch 13, up and down shifting being effected by operating level 47 and enabling a respective signal 12. For example, for shifting from first to second gear, control unit 45, subsequent to receiving said signal 12, provides for:

- enabling signal U2: solenoid valve E2 switches to connect chamber C2 of actuator A52 to solenoid valve E7;
- enabling signal U7; actuator A52 causes coupling M52 to engage the second gear (gear R'2), as already described in connection with the first; such engagement being detected control unit 45 via a corresponding change in respective signal 17;
- gradually and appropriately de-energizing solenoid valves E8, E9, for engaging clutch Fp and releasing clutch Fd; the drive torque gradually switching from shaft 5 to shaft 4;
- disabling signals U2, U7;
- simultaneously enabling signals U1, U3: both chambers C1, C3 on the actuator are connected to solenoid valve E7;
- enabling signal U7: actuator A13 switches back to neutral to release the first gear; such release being detected by control unit 45 via a corresponding change in respective signal 17;
- disable signals U1, U3, U7.

Up or down shifting between any two gears is effected in exactly the same way as described for the first and second gears, i.e. by:

- engaging the new gear;
- switching clutches Fd, Fp under load;
- releasing the previous gear.

For switching from one speed range to another, the operator presses pedal 14 of central clutch 13, which enables signal 15; control unit 45 only energizes solenoid valve E8; both clutches Fd, Fp are released; and the speed range is switched as required by means of level 37. When speed range switching with second stage 3 in neutral (zero signals I3), control unit 45 also provides for switching first stage 2 to neutral by releasing the engaged gear as already described, and so enabling speed range switching to be effected with minimum inertia.

Once the speed range has been switched, control unit 45 enables signals for automatically re-engaging in stage 2 the most appropriate gear in the selected speed range, as a function of the tractor speed detected by sensor 48. The first gear is usually, though not necessarily, engaged when switching to a higher range, and the sixth gear when switching to a lower range. At this point, pedal 14 of clutch 13 may be released for pulling away.

The advantages of transmission 1 according to the present invention will be clear from the foregoing description. In particular, clutches Fd, Fp are operated by appropriately increasing or reducing pressure as a function of specific service conditions, and by virtue of proportional-response solenoid valves E8, E9 controlled by control unit 45. Gear shifting in first stage 2 is performed simply, effectively and gradually, by virtue of actuators A13, A52, A46, on-off solenoid valves E1, . . . , E6, and proportional-response solenoid valve E7. Moreover, hydraulic control means 15 are of extremely straightforward design, reliable, compact, and cheap to produce.

To those skilled in the art it will be clear that changes may be made to transmission 1 as described and illustrated herein without, however, departing from the scope of the present invention.

We claim:

1. A vehicle transmission, particularly for an agricultural tractor, comprising an input shaft at least a first stage having two drive shafts selectively connectable to said input shaft via respective first hydraulic clutch means, an output shaft angularly connectable to each said drive shaft via a number of transmission ratios defined by respective constant mesh gears, and second selective clutch means for each pair of adjacent said gears, operated by respective three-position hydraulic actuators; and control means for controlling said first clutch means and said hydraulic actuators; characterised by the fact that said control means comprise two on-off solenoid valves (E1, E3, E5, E2; E4, E6) for each said hydraulic actuator (A13, A52, A46), each designed to control engagement of a respective transmission ratio; two proportional-response solenoid valves (E8, E9) for engaging and releasing respective said first clutch means (Fp, Fd) on said drive shafts (4, 5); at least a third proportional-response solenoid valve (E7) for regulating supply pressure to said on-off solenoid valves (E1,. . .,E6); and a control unit (45) designed to control said solenoid valves (E1, . . . ,E9) in such a manner as to engage and release said first and second clutch means (Fp, Fd; M13, M52, M46) according to predetermined laws depending on the service condition of said vehicle.

2. A transmission as claimed in claim 1, characterised by the fact that said first clutch means compromise a clutch (Fd) assigned to one of said drive shafts (5) connected to said gears (R1, R3, R5) defining the odd number transmission ratios; and a clutch (Fp) assigned to the other side drive shaft (4) connected to said gears (R2, R4, R6) defining the even number transmission ratios; one of said clutches being normally engaged, and the other normally released.

3. A transmission as claimed in claim 1, characterised by the fact that at least one (4) of said drive shafts (4, 5) is hollow, the other said drive shaft (5) being coaxial and located partially inside the same; said gears comprising a number of gears (R1, R3, R5; R2, R4, R6) fitted on to each said drive shaft (4, 5), and a number of gears (R'1, R'3 R'5; R'2, R'4, R'6) meshing with the same and mounted in idle manner on said output shaft (16) with which they are engaged via sliding couplings (M13, M52, M46) and synchronizing means defining said second clutch means.

4. A transmission as claimed in claim 3, characterised by the fact that said actuators (A13, A52, A46) comprises a dual-rod piston (23) integral with a respective coupling (M13, M52, M46) in said first stage (2) and sliding inside a cylindrical cavity (24); a pair of bushes (26) sliding in sealed manner between said piston (23) and the inner walls of said cavity (24); and stop means (27) located centrally on said piston (23) and said wall of said cavity (24); said piston (23) and said bushes (26) defining, inside said caviity (24), two opposed chambers (C1, C3; C5, C2; C4, C6) connected to respective on-off solenoid valves (E1, E3; E5, E2; E4, E6).

5. A transmission as claimed in claim 1, characterised by the fact that said input shaft (12) is driven by a third clutch (13) controlled by a pedal (14).

6. A transmission as claimed in claim 1, characterised by the fact that it comprises a second stage (3) cascade-connected to said first stage (2) and defining a number of transmission ratios (L, M, V, R) including at least one reverse, and engageable in combination with each said transmission ratio of said first stage (2) via a hand-operated lever (37).

7. A transmission as claimed in claim 4, characterised by the fact that it comprises means, connected to said control unit (45), for detecting engagement of a transmission ratio in said first and second stages (2, 3).

8. A transmission as claimed in claim 6, characterised by the fact said control unit (45) comprises processing means for selecting engagement of an appropriate transmission ratio in said first stage (2) subsequent to a change in transmission ratio in said second stage (3).

9. A transmission as claim 1, characteristed by the fact that it comprises means (P), connected to said control unit (45), for selecting a transmission ratio in said first stage (2).

10. A transmission as claimed in claim 1, characterised by the fact that it comprises means (48), connected to said control unit (45), for detecting the speed of said vehicle.

11. A transmission as claimed in claim 1, characterised by the fact that it comprises manual control means (47) connected to said control unit (45) and designed to select engagement of a higher or lower transmission ratio in relation to the one currently engaged.

* * * * *

UNITED STATES PATENT AND TRADEMARK OFFICE
CERTIFICATE OF CORRECTION

PATENT NO. : 4,957,016

DATED : September 18, 1990

INVENTOR(S) : Giuseppe Amedei and Angelo Rondelli

It is certified that error appears in the above-identified patent and that said Letters Patent is hereby corrected as shown below:

On the title page item [73]:
Please correct Assignee's name:
"Fiatgeotech - Technologie Per La Terra S.p.A."

which should read

--Fiatgeotech - Tecnologie Per La Terra S.p. A.--

Signed and Sealed this

Twenty-fifth Day of August, 1992

*Attest:*

DOUGLAS B. COMER

*Attesting Officer*   *Acting Commissioner of Patents and Trademarks*